(12) United States Patent
Terano et al.

(10) Patent No.: US 6,657,020 B1
(45) Date of Patent: Dec. 2, 2003

(54) PROCESS FOR THE PREPARATION OF POLYPROPYLENE-B-POLY(ETHYLENE-CO-PROPYLENE)

(75) Inventors: Minoru Terano, Daigakushukusha A-35, 1-50, Asahidai, Tatsunokuchi-machi, Nomi-gun Ishikawa 923-1211 (JP); Tetsuya Matsukawa, Kanagawa (JP); Hideshi Satake, Kanagawa (JP); Masato Takahashi, Kanagawa (JP)

(73) Assignees: Chisso Petrochemical Corporation, Tokyo (JP); Japan Science and Technology Corporation, Saitama (JP); Minoru Terano, Ishikawa (JP)

( * ) Notice: Subject to any disclaimer, the term of this patent is extended or adjusted under 35 U.S.C. 154(b) by 0 days.

(21) Appl. No.: 09/554,762
(22) PCT Filed: Nov. 20, 1998
(86) PCT No.: PCT/JP98/05229
§ 371 (c)(1),
(2), (4) Date: Jul. 20, 2000
(87) PCT Pub. No.: WO99/26986
PCT Pub. Date: Jul. 3, 1999

(30) Foreign Application Priority Data

| Nov. 21, 1997 | (JP) | ............................. 9-336613 |
| Feb. 19, 1998 | (JP) | ........................... 10-054356 |
| Feb. 19, 1998 | (JP) | ........................... 10-054357 |
| Mar. 12, 1998 | (JP) | ........................... 10-080456 |
| Mar. 12, 1998 | (JP) | ........................... 10-080457 |
| Mar. 12, 1998 | (JP) | ........................... 10-080458 |
| Aug. 26, 1998 | (JP) | ........................... 10-240921 |
| Aug. 28, 1998 | (JP) | ........................... 10-243078 |

(51) Int. Cl.[7] ............................. C08F 2/01; C08F 4/44; C08F 10/06; C08F 110/06
(52) U.S. Cl. .................. 526/64; 526/65; 526/124.3; 526/128; 526/155; 526/157; 526/348
(58) Field of Search ................. 525/53, 247, 323; 526/64, 65, 60, 124.3, 348, 128, 155, 157

(56) References Cited

U.S. PATENT DOCUMENTS

| 4,310,639 A | 1/1982 | Hagemeyer, Jr. et al. |
| 4,576,994 A | 3/1986 | Dorrer et al. |
| 4,740,551 A | 4/1988 | Foster |
| 4,977,210 A | * 12/1990 | Kerth et al. .................. 525/53 |
| 5,990,235 A | * 11/1999 | Terano ........................ 525/53 |

FOREIGN PATENT DOCUMENTS

| JP | 58-187413 | 11/1983 |
| JP | 6-136072 | 5/1994 |
| JP | 6-136073 | 5/1994 |
| JP | 7-157525 | 6/1995 |
| JP | 8-92338 | 4/1996 |
| JP | 8-169924 | 7/1996 |
| JP | 9-87343 | 3/1997 |

* cited by examiner

*Primary Examiner*—Robert Harlan
(74) *Attorney, Agent, or Firm*—Wenderoth, Lind & Ponack, L.L.P.

(57) ABSTRACT

A process for preparing polypropylene-b-poly(ethylene-co-propylene) by the use of a tubular continuous polymerizer in the presence of an olefin-polymerizing catalyst comprising a solid catalyst component (1) composed of titanium and halogen; an organosilicon compound (2); and, if necessary, at least one electron-donating compound (3) selected from the group consisting of organosilicon compounds represented by the general formula: $R_nSi(OR')_{4-n}$ (wherein R and R' are each independently a C1–C10 hydrocarbon group; and n is an integer of 1 to 3) and nitrogenous heterocyclic compounds, wherein the solid catalyst component (1) is preliminarily brought into contact with the organosilicon compound (2) in the presence of the electron-donating compound (3), and then a polypropylene segment is formed through polymerization, followed by formation of a poly(ethylene-co-propylene) segment at the end of the polypropylene segment through polymerization. The process enables efficient preparation of the polymer with a reduced content of inorganic contaminants, even when the polymer is one having a weight-average molecular weight of as high as 100,000 or more.

30 Claims, 1 Drawing Sheet

PROCESS FOR THE PREPARATION OF POLYPROPYLENE-B-POLY(ETHYLENE-CO-PROPYLENE)

TECHNICAL FIELD

The present invention relates to a process for preparing a block copolymer comprising a polypropylene segment and a poly(ethylene-co-propylene) segment, with the two types of segments being chemically linked. More particularly, the present invention relates to a process for preparing a block copolymer, which process comprises forming a polypropylene segment formed through polymerization and forming a poly(ethylene-co-propylene) segment at an end of the polypropylene segment, in the presence of a catalyst comprising a solid catalyst component, at least one organometallic compound, and, if necessary, an electron-donating compound (e.g., an organosilicon compound and a nitrogenous heterocyclic compound), the solid catalyst component being preliminarily brought into contact with the organometallic compound in accordance with needs.

The thus-produced block copolymer has excellent impact resistance and is useful as a molding raw material, a compatibilizer for a crystalline polyolefin and an amorphous polyolefin, and a modifier for polyolefins such as polypropylene and polyethylene.

BACKGROUND ART

Polyolefins such as polypropylene and polyethylene are widely used in consumer goods, due to their excellent properties (e.g., mechanical strength, heat resistance, resistance to chemicals, electrical insulating property), excellent processability, and low cost. Among these polyolefins, polypropylene has comparatively high rigidity but has poor impact strength. In order to improve the impact strength, amorphous poly(ethylene-co-propylene) having high impact strength has been blended with polypropylene. In a conventional block copolymer, a matrix phase comprising polypropylene and a domain phase comprising poly(ethylene-co-propylene) are separated. Therefore, when the block copolymer is subjected to impact, a matrix phase and a domain phase are separated, to thereby generate blushing and degrade physical properties after that. Thus, there is still demand for improving such drawbacks.

Conventionally, a block copolymer comprising polypropylene and poly(ethylene-co-propylene) is known as a type of modified polypropylene. In a conventional process for producing the block copolymer, the polymer is synthesized through a two-step polymerization method; i.e., polypropylene is synthesized in a first polymerizer over 30 minutes to several hours, followed by synthesis of poly(ethylene-co-propylene) in a second polymerizer over 30 minutes to several hours. When the time allotted for forming one polymer chain is taken into consideration, polypropylene and poly(ethylene-co-propylene) contained in the thus-obtained block copolymer are not linked via a chemical bond, and are in a microscopically blended state. Thus, the product is not a genuine block copolymer as defined in polymer chemistry, and satisfactory characteristics commensurate with an object might not be obtained.

Japanese Patent Application Laid-Open (kokai) Nos. 8-92338 and 9-87343 disclose a process for producing a genuine block copolymer in which polypropylene and poly(ethylene-co-propylene) are linked via a chemical bond. In the process, the genuine block copolymer is polymerized within each short time in polypropylene and poly(ethylene-co-propylene)polymerization such that substantially no chain-transfer reaction occurs in the presence of a Ziegler catalyst or a metallocene catalyst by use of a tubular polymerizer.

The above-disclosed genuine block copolymer in which polypropylene and poly(ethylene-co-propylene) are linked via a chemical bond; i.e., polypropylene-b-poly(ethylene-co-propylene), has improved blushing resistance and impact strength, and the above process provides block copolymer material having excellent characteristics.

However, since the polypropylene-b-poly(ethylene-co-propylene) obtained through the disclosed process has a low molecular weight, a higher molecular weight is required in order to improve physical properties, such as mechanical strength, and heat resistance and processability.

In addition, the disclosed process provides polypropylene-b-poly(ethylene-co-propylene) at low yield, and the produced polymer contains a considerable amount of inorganic residues, which causes degradation in quality thereof; e.g., lower processability or generation of fisheyes.

When the disclosed process is carried out at a polymerization pressure of 3 atm or more, the produced polypropylene-b-poly(ethylene-co-propylene) has an n-heptane extraction ratio of more than 20 wt. %. Thus, dissolution of the polymer in a solvent for polymerization, cohesion of the polymer, and adhesion of the polymer to an inner wall of a polymerizer occur, to thereby render control of polymerization temperature difficult. As a result, anomalous polymerization and plugging of the polymerizer might occur. In contrast, when the process is carried out at a polymerization pressure of 3 atm or less, production efficiency decreases.

In view of the foregoing, an object of the present invention is to enhance catalytic activity for producing a genuine block copolymer in which a polypropylene segment and a poly(ethylene-co-propylene) segment are linked via a chemical bond, to thereby reduce the amounts of inorganic residues. Another object of the invention is to provide a genuine block copolymer having a weight average molecular weight of 100,000 or more. Still another object of the invention is to produce a genuine block copolymer exhibiting an n-heptane extraction ratio of 20 wt. % or less without involving adhesion of a polymer to an inner wall of a polymerizer.

DISCLOSURE OF THE INVENTION

The present inventors have conducted earnest studies on a process for producing a genuine block copolymer in which polypropylene and poly(ethylene-co-propylene) are linked via a chemical bond, and have found that ethylene and propylene are copolymerized to an end of a polypropylene segment by use of a solid catalyst component which comprises a solid catalyst component (1) containing titanium and halogen, or titanium, magnesium, and halogen, and which has been preliminary activated by being brought into contact (also referred to as preliminary contact) with a catalyst component (2) containing at least one organometallic compound, within a polymerization period of time in which substantially no chain-transfer reaction occurs, to thereby produce polypropylene-b-poly(ethylene-co-propylene) with high efficiency at high catalytic activity and reduce the amount of residual inorganic matter in the produced block copolymer. The present invention has accomplished on the basis of this finding.

Furthermore, the present inventors also found that the aforementioned drawbacks can be resolved by employing a specific electron-donating compound such as a silicon compound or a nitrogenous heterocyclic compound as an external donor, to thereby attain the present invention.

Accordingly, in a first aspect of the present invention, there is provided a process for producing polypropylene-b-poly(ethylene-co-propylene) in the presence of an olefin-polymerizing catalyst comprising a solid catalyst component (1) containing titanium and halogen, or titanium, magnesium, and halogen, and an organometallic compound (2), wherein the solid catalyst component (1) is preliminarily brought into contact with the organometallic compound (2), and then a polypropylene segment is formed through polymerization, followed by formation of a poly(ethylene-co-propylene) segment at an end of the polypropylene segment through polymerization.

In a second aspect of the present invention, there is provided a process for producing polypropylene-b-poly (ethylene-co-propylene) in the presence of an olefin-polymerizing catalyst comprising a solid catalyst component (1) containing titanium and halogen, or titanium, magnesium, and halogen; an organometallic compound (2); and at least one electron-donating compound (3) selected from the group consisting of organosilicon compounds represented by $R_nSi(OR')_{4-n}$ (wherein each of R and R', which may be identical to or different from each other, represents a C1–C10 hydrocarbon group and n is an integer of 1 to 3) and a nitrogenous heterocyclic compound represented by the following formula (1):

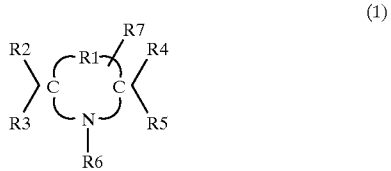

(1)

(wherein R1 represents a C1–C6 hydrocarbon group; each of R2, R3, R4, and R5 represents hydrogen or a C1–C6 hydrocarbon group; at least one of R2 and R3 and at least one of R4 and R5 represent hydrocarbon groups, respectively, and R2 and R3 or R4 and R5 may be linked to form a ring; R6 represents hydrogen or a C1–C6 alkyl group or alkyloxy group; and R7 represents hydrogen or a C1–C6 alkyl group or alkyloxy group), wherein a polypropylene segment is formed through polymerization, followed by formation of a poly(ethylene-co-propylene) segment at an end of the polypropylene segment through polymerization.

In a third aspect of the present invention, there is provided a process for producing polypropylene-b-poly(ethylene-co-propylene) as described in the second aspect, wherein the solid catalyst component (1) is preliminarily brought into contact with the organometallic compound (2) in the presence of an electron-donating compound (3).

In a fourth aspect of the present invention, there is provided a process for producing polypropylene-b-poly (ethylene-co-propylene) in the presence of an olefin-polymerizing catalyst comprising a solid catalyst component (1) containing titanium and halogen, or titanium, magnesium, and halogen, and an organometallic compound (2), wherein a polypropylene segment is formed through polymerization, and then an electron-donating compound as described in the second aspect is added, followed by formation of a poly(ethylene-co-propylene) segment at an end of the polypropylene segment through polymerization.

In a fifth aspect of the present invention, there is provided a process for producing polypropylene-b-poly(ethylene-co-propylene) as described in the fourth aspect, wherein the solid catalyst component (1) is preliminarily brought into contact with the organometallic compound (2).

In a sixth aspect of the present invention, there is provided a process for producing polypropylene-b-poly(ethylene-co-propylene) as described in any one of the first to fifth aspects, wherein the organometallic compounds comprise at least two different organometallic compounds represented by $R_nAlCl_{3-n}$ (wherein each of R represents a C1–C20 alkyl group, an aryl group, or a C3–C20 cycloalkyl group; and n is an integer of 1 to 3 or a half value thereof).

In a seventh aspect of the present invention, there is provided a process for producing polypropylene-b-poly (ethylene-co-propylene) as described in any one of the first to sixth aspects of the invention, wherein a tubular continuous polymerizer including a polymerization zone "a" and a polymerization zone b located downstream of the zone "a" is used and a polypropylene segment is formed through polymerization in the polymerization zone "a," followed by formation of a poly(ethylene-co-propylene) segment at an end of the polypropylene segment through polymerization in the polymerization zone "b."

In an eighth aspect of the present invention, there is provided a process for producing polypropylene-b-poly (ethylene-co-propylene) as described in the seventh aspect, wherein each of residence times in the polymerization zone "a" and "b" is 0.01 second to 15 minutes.

In a ninth aspect of the present invention, there is provided a process for producing polypropylene-b-poly (ethylene-co-propylene) as described in the seventh aspect, wherein reaction in the tubular continuous polymerizer is carried out in a plug-flow manner.

In a tenth aspect of the present invention, there is provided a process for producing polypropylene-b-poly(ethylene-co-propylene) as described in any one of the first to ninth aspects, wherein a weight average molecular weight is 100,000 or more.

In an eleventh aspect of the present invention, there is provided a process for producing polypropylene-b-poly (ethylene-co-propylene) as described in any one of the first to ninth aspects, wherein an n-heptane extraction ratio is 20 wt. % or less.

In a twelfth aspect of the present invention, there is provided a process for producing polypropylene-b-poly (ethylene-co-propylene) as described in any one of the first to ninth aspects, wherein the amount of inorganic matter derived from a catalyst is 100 ppm or less.

BEST MODE FOR CARRYING OUT THE INVENTION

Figure 1:
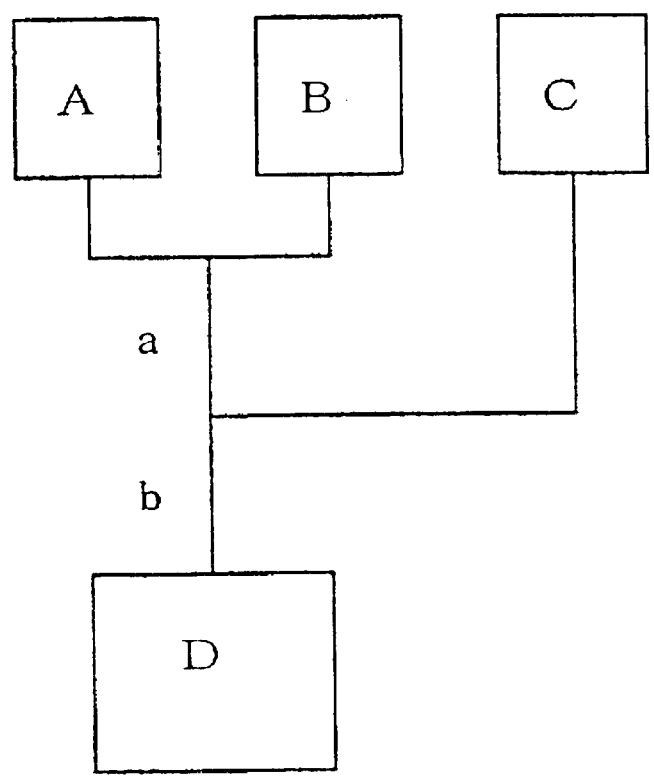
FIG. 1 is a flow sheet showing a polymerization process of the present invention.

In the present invention, the term "polypropylene segment" refers to a polypropylene portion (represented by polypropylene-) in a block copolymer represented by polypropylene-b-poly(ethylene-co-propylene), and the term "poly(ethylene-co-propylene) segment" refers to a copolymer portion (represented by -poly(ethylene-co-propylene) in the block copolymer.

In addition, the term "polypropylene" refers to simply a conventional propylene homopolymer, and the term "poly (ethylene-co-propylene)" refers to simply a conventional ethylene-propylene copolymer.

The above-described poly(ethylene-co-propylene) segment may be a random copolymer, a block copolymer, or a mixture thereof.

In the present invention, the term "polypropylene-b-poly(ethylene-co-propylene)" is intended to refer to a genuine block copolymer in which a polypropylene segment and a poly(ethylene-co-propylene) segment are linked via a chemical bond (covalent bond). The term "block copolymer" may also be used in place of the above term, where these terms can be understood without confusion.

The term "process for producing polypropylene-b-poly(ethylene-co-propylene)" encompasses a process for producing whole polymers including polypropylene-b-poly(ethylene-co-propylene). Accordingly, the term "polypropylene-b-poly(ethylene-co-propylene)" typically encompasses whole polymers produced in the process.

The polypropylene-b-poly(ethylene-co-propylene) obtained in accordance with the present invention per se has excellent impact resistance and is usable as a raw material for molding. In addition, the polymer has properties suitable for a compatibilizer of a crystalline polyolefin and an amorphous polyolefin and a modifier for polyolefins such as polypropylene or polyethylene. Although no particular limitation is imposed on the crystallinity of a propylene segment, a polypropylene segment preferably comprises a predominant amount of isotactic portions.

In the present invention, polypropylene and/or poly(ethylene-co-propylene) can also be produced to coexist with a block copolymer through control of polymerization conditions.

In the present invention, the length of a polypropylene segment and that of a poly(ethylene-co-propylene) segment, the proportion between these segments, and an ethylene unit content in the poly(ethylene-co-propylene) segment can be selected within the range in which desired properties are obtained.

The process for polypropylene-b-poly(ethylene-co-propylene) according to the present invention uses an olefin-polymerizing catalyst comprising a solid catalyst component (1) containing titanium and halogen, or titanium, magnesium, and halogen; at least one organometallic compound (2); and, if necessary, an electron-donating compound (3).

A variety of catalysts, such as a titanium tetrachloride-on-magnesium chloride catalyst or a titanium trichloride catalyst, can be used as the solid catalyst component (1).

As the organometallic compound (2) there can be used $R_nAlCl_{3-n}$ (wherein, R is a C1–C20 alkyl group, an aryl group, or a C3–C20 cycloalkyl group, with a C1–C8 alkyl group being preferred; n is an integer of 1 to 3 or a half value thereof, in the case of the half value thereof with the half value 1.5 (sesqui) being preferred).

Examples of the organoaluminum compounds include trialkylaluminum compounds such as triethylaluminum, tri-n-propylaluminum, tri-n-butylaluminum, tri-n-hexylaluminum, tri-n-octylaluminum, tri-iso-butylaluminum, tricyclopentylaluminum, and tricyclohexylaluminum; dialkylaluminum halides such as dimethylaluminum chloride, diethylaluminum chloride, di-n-butylaluminum chloride, and di-iso-butylaluminum chloride; ethylaluminum sesquichloride; and alkylaluminum dihalides such as ethylaluminum dichloride.

These organometallic compounds may be used in combination of two or more species as organometallic compounds (2).

Examples of preferred combinations include a combination of two different organometallic compounds, such as triethylaluminum and diethylaluminum chloride; tri-iso-butylaluminum and diethylaluminum chloride; or triethylaluminum and ethylaluminum sesquichloride; and a combination of three different organometallic compounds, such as triethylaluminum, tri-iso-butylaluminum, and diethylaluminum chloride.

In a combination of two or more different organometallic compounds, the proportion of each component is 1–99 mol %, preferably 10–90 mol %, more preferably 20–80 mol %, particularly preferably 30–70 mol %. The total proportions of organometallic compounds account for 100 mol %.

The electron-donating compound (3) is also called a "donor." Examples include organosilicon compounds described below, heterocyclic compounds described below, ethers, esters, and mixtures thereof.

As an organosilicon compound there may be used $R_nSi(OR')_{4-n}$ (wherein each of R and R', which may be identical to or different from each other, represents a C1–C10 hydrocarbon group, and n is an integer of 1 to 3).

Examples of the substituent R in the above formula include a methyl group, an ethyl group, a vinyl group, an n-propyl group, an iso-propyl group, an allyl group, an n-butyl group, an iso-butyl group, a sec-butyl group, a tert-butyl group, pentyl groups, a cyclopentyl group, hexyl groups, a cyclohexyl group, heptyl groups, a cycloheptyl group, octyl groups, a cyclooctyl group, nonyl groups, a cyclononyl group, decyl groups, a cyclodecyl group, a phenyl group, and substituted phenyl groups.

Examples of the substituent OR' in the above formula include a methoxy group, an ethoxy group, a vinyloxy group, an n-propoxy group, an iso-propoxy group, an allyloxy group, an n-butoxy group, an iso-butoxy group, a sec-butoxy group, pentoxy groups, a cyclopentoxy group, hexyloxy groups, a cyclohexyloxy group, heptoxy groups, a cycloheptoxy group, octoxy groups, a cyclooctoxy group, nonyloxy groups, a cyclononyloxy group, decyloxy groups, a cyclodecyloxy group, a phenyloxy group, and substituted phenyloxy groups.

Specific examples include trimethylmethoxysilane, trimethylethoxysilane, dimethyldimethoxysilane, dimethyldiethoxysilane, diisopropyldimethoxysilane, di(n-propyl)dimethoxysilane, diisobutyldimethoxysilane, di(n-butyl)dimethoxysilane, diphenyldimethoxysilane, methylphenyldimethoxysilane, cyclohexylmethyldimethoxysilane, methyltrimethoxysilane, phenyltrimethoxysilane, vinyltrimethoxysilane, and butyltrimethoxysilane.

A nitrogenous heterocyclic compound represented by the aforementioned formula (1) may be used as the heterocyclic compound of the present invention.

The substituent represented by R6, including hydrogen, a C1–C6 alkyl group and an alkyloxy group, may be attached to the nitrogen atom in formula (1).

R1, which is a C1–C6 hydrocarbon group, forms a heterocyclic ring. Each of R2, R3, R4, and R5 is hydrogen or a C1–C6 hydrocarbon group. At least one of R2 and R3 is a hydrocarbon group, and at least one of R4 and R5 is a hydrocarbon group. R2 and R3, or R4 and R5 may be linked to each other to form a ring.

The heterocyclic group may be substituted by a substituent represented by R7, which is hydrogen, a C1–C6 alkyl group, or an alkyloxy group.

Specific examples include compounds having a skeleton represented by the formula (2) below:

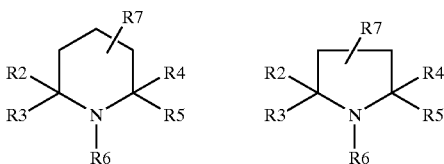

(2)

(wherein each of R2, R3, R4, and R5 represents hydrogen or a C1–C6 hydrocarbon group; at least one of R2 and R3 and at least one of R4 and R5 represent hydrocarbon groups, respectively; and R2 and R3 or R4 and R5 may be linked to form a ring; and R6 represents hydrogen or a C1–C6 alkyl group or alkyloxy group).

Specific examples include 2,6-disubstituted piperidines such as 2,6-dimethylpiperidine, 2,6-diisobutylpiperidine, 2,2,6,6-tetramethylpiperidine, 2,2,6,6-tetraethylpiperidine, N-methyl-2,2,6,6-tetramethylpiperidine, and N-ethyl-2,2,6,6-tetramethylpiperidine; and 2,5-disubstituted pyrrolidines such as 2,5-dimethylpyrrolidine, 2,5-diisopropylpyrrolidine, 2,2,5,5-tetramethylpyrrolidine, N-methyl-2,2,5,5-tetramethylpyrrolidine, and N-ethyl-2,2,5,5-tetramethylpyrrolidine.

The electron-donating compound may be added to a solid catalyst in a mol ratio (electron-donating compound/Ti) of, for example, 0.05–200. The electron-donating compound may be added in a single portion during preliminary contact, added as several portions to other components, or added during formation of a poly(ethylene-co-propylene) segment through polymerization.

Specifically, the electron-donating compound is added during preparatory treatment and/or polymerization in a mol ratio (M/Ti) of 0.05–200, preferably 0.5–100, wherein M represents an electron-donating atom or group in the electron-donating compound (e.g., Si in an organosilicon compound or N in a nitrogenous compound), and Ti represents Ti atoms contained in a solid catalyst component.

Strictly speaking, the aforementioned ratio (electron-donating compound/Ti) should be represented by a ratio (mol/gram atom). However, in the present specification, the ratio is simply represented by a mol ratio. Similarly, ratios Al/Ti, Si/Ti, N/Ti, etc. are all on a mol basis.

The electron-donating compound (3) may be added during formation of a poly(ethylene-co-propylene) segment through polymerization instead of addition during formation of a polypropylene segment. In this case, preliminary contact of a solid catalyst component (1) with an organometallic compound (2) may be omitted.

Alternatively, polymerization is carried out in the presence of a solid catalyst component (1), an organometallic compound (2), and a portion of an electron-donating compound (3) to thereby form a polypropylene segment, and then the remaining portion of the electron-donating compound may be added during formation of a poly(ethylene-co-propylene) segment through polymerization.

Preliminary contact of the aforementioned solid catalyst with the organometallic compound may be carried out in the presence of the electron-donating compound (3). Alternatively, the electron-donating compound (3) may be added after completion of preliminary contact of the aforementioned solid catalyst with the organometallic compound.

In the presence of the aforementioned solid catalyst component (1), organometallic compound (2), and electron-donating compound (3), a polypropylene segment can be formed through polymerization.

The electron-donating compound (3) may comprise a mixture of such compounds. Electron-donating compounds which differ from one another may be employed during formation of a polypropylene segment and during formation of a poly(ethylene-co-propylene) component through polymerization.

To the aforementioned solid catalyst component and organometallic compound, there may be added zirconium, hafnium, cobalt, nickel, vanadium, and a compound thereof.

Preliminary contact of the solid catalyst component with the organometallic compound may be carried out or omitted.

There will next be described the cases in which the solid catalyst component is preliminarily brought into contact with the organometallic compound before the catalyst is applied to polymerization.

Method of Preparatory Treatment

The solid catalyst component and an organometallic compound are employed such that the mol ratio of Al in an alkylaluminum-organometallic compound to Ti in the solid catalyst component, represented by (Al/Ti), is 0.1–200, preferably 1–50.

When the solid catalyst component is preliminarily brought into contact with the organometallic compound, contact is carried out such that the Al/Ti ratio is similarly 0.1–200, preferably 1–50.

When two or more alkylaluminum compounds are used, the mol ratio of Ti in the solid catalyst component to total Al atoms lies within the above range.

A portion of, or preferably the total amount of, the solid catalyst component is brought into contact with a portion of or the total amount of the organometallic compound serving as a catalyst aid. When the organometallic compound is partially added during preliminary contact, the remainder of the compound per se, or a mixture of a monomer and the remainder of the compound, is added to a polymerization system.

When two or more alkylaluminum compounds are used, all the species may be mixed or some of the species may be mixed so as to be added for preliminary contact.

Preliminary contact of the solid catalyst component with an organometallic compound in the form of a liquid may be carried out. However, preferably, at least one of the components is suspended or completely dissolved in a solvent which is inert to polymerization, and then the components are mixed together. As the aforementioned inert solvent, the under-mentioned polymerization solvents are usable.

Examples of apparatus for mixing include a mixing bath equipped with an agitator; a line mixer; a vibration mixer, an ultrasound mixer; and a crushing mixer.

Preliminary contact is carried out at 0–100° C., preferably 5–70° C.; for 0.05 seconds to 48 hours, preferably 0.3 seconds to 24 hours; and under reduced pressure, atmospheric pressure, or pressurized conditions. However, these conditions are not particularly limited. The atmosphere for carrying out preliminary contact is not particularly limited so long as the catalyst is not deactivated, and the atmosphere may be an inert gas atmosphere such as high-purity dry nitrogen.

When the solid catalyst component (1) is preliminarily brought into contact with the organometallic compound (2), the electron-donating compound (3) may be added during contact, alternatively in case of being not added during contact, the compound (3) may be added to the solid catalyst component (1), the organometallic compound (2), and/or monomers such as ethylene, propylene, and an ethylene-propylene mixture.

There will next be described the cases in which preliminarily contact of the solid catalyst component (1) with the organometallic compound (2) is omitted.

When preliminary contact is omitted, the electron-donating compound (3) is added to the solid catalyst component (1), the organometallic compound (2), and/or monomers such as ethylene, propylene, and an ethylene-propylene mixture. When the compound is added only to ethylene, a mixture of unreacted propylene and ethylene is formed in a reactor.

A variety of modes for carrying out the present invention will be summarized.

(A) With Carrying Out Preliminary Contact (a) Employing a solid catalyst component and an organometallic compound: the solid catalyst is preliminarily brought into contact with the organometallic compound, followed by sequential formation of a polypropylene segment and a poly(ethylene-co-propylene) segment through polymerization.

(b) Employing a solid catalyst component, an organometallic compound, and an electron-donating compound: the solid catalyst is preliminarily brought into contact with the organometallic compound in the presence of the electron-donating compound, followed by sequential formation of a polypropylene segment and a poly(ethylene-co-propylene) segment through polymerization.

(b') Employing a solid catalyst component, an organometallic compound, and an electron-donating compound: the solid catalyst is preliminarily brought into contact with the organometallic compound in the presence of the electron-donating compound. A polypropylene segment is formed through polymerization in the presence of the catalyst with addition of the electron-donating compound, followed by formation of a poly(ethylene-co-propylene) segment through polymerization.

(b") Employing a solid catalyst component, an organometallic compound, and an electron-donating compound: the solid catalyst is preliminarily brought into contact with the organometallic compound in the presence of the electron-donating compound. A polypropylene segment is formed through polymerization in the presence of the catalyst, followed by formation of a poly(ethylene-co-propylene) segment through polymerization with addition of the electron-donating compound.

(B) Without Carrying Out Preliminary Contact (c) Employing a solid catalyst component and an organometallic compound: in the presence of the solid catalyst and two or more organometallic compounds, a polypropylene segment and a poly(ethylene-co-propylene) segment are sequentially formed through polymerization.

(d) Employing a solid catalyst component, an organometallic compound, and an electron-donating compound: in the presence of the solid catalyst, the organometallic compound, and the electron-donating compound, a polypropylene segment and a poly(ethylene-co-propylene) segment are sequentially formed through polymerization.

(d') Employing a solid catalyst component, an organometallic compound, and an electron-donating compound: in the presence of the solid catalyst, the organometallic compound, and the electron-donating compound, a polypropylene segment is formed through polymerization, followed by formation of a poly(ethylene-co-propylene) segment through polymerization with addition of the electron-donating compound.

As described above, two or more organometallic compounds are employed in mode (c); however, the plurality of organometallic compounds may be used in other modes.

One example of the process for polymerization of the present invention will be described with reference to a drawing. FIG. 1 is a flow sheet showing a process for polymerization of the present invention. In FIG. 1, each of A, B, C, and D represents a container, and each of "a" and "b" represents a polymerization zone of a corresponding tubular continuous polymerizer.

No particular limitation is imposed on the form, such as a length/diameter ratio, of employed tubular continuous polymerizers, and any of these may be used so long as it can be supplied with raw materials, the reaction can be conducted in it and the reaction mass can be exhausted outside it, within the below-described residence time. The reaction in a tubular continuous polymerizer is preferably carried out in a plug flow manner. Means such as a baffle may be disposed in a reaction tube so as to enhance agitation effect, so long as the reaction can be conduced in it within the below-described residence time and the reaction mass can be exhausted outside it. In the present invention, the term "plug flow manner" also refers to such a mode of reaction.

In container A are placed a solid catalyst component; an organometallic compound such as alkylaluminum; or a catalyst component obtained through preliminary contact thereof; an electron-donating compound; and a solvent.

When two or more organometallic compounds are employed, a solid catalyst component; a mixture of two or more organometallic compounds; or a catalyst component obtained through preliminary contact thereof; an optional electron-donating compound; and a solvent are placed in container A.

As described above, the mol ratio (Ti/Al) of Ti placed in container A to Al placed in containers A and B is 0.1–200, preferably 1–50.

Alkylaluminum and a solvent are placed in container B. Propylene is dissolved in the resultant mixture. An optional electron-donating compound may be added.

No particular limitation is imposed on the amount of alkylaluminum, and the mol ratio (Ti/Al) of Ti placed in container A to Al placed in container B is 1–1,000, preferably 30–500.

A solvent is placed in container C. Ethylene or a mixture of ethylene and propylene is dissolved in the solvent. Particularly, an optional electron-donating compound may be added during formation of a copolymer segment through polymerization.

In a first stage of the process, the liquid which has flowed out from container A and that which has flowed from container B are intermingled, to thereby form a polypropylene segment through polymerization in the polymerization zone "a." Subsequently, the liquid which has flowed out from container C is introduced to the polymerization zone "b," where there is formed a poly(ethylene-co-propylene) segment which is linked via a chemical bond to an end of the polypropylene segment synthesized in the polymerization zone "a."

The liquid which has flowed out from the polymerization zone "b" is introduced to container D, to thereby terminate polymerization. Subsequently, the solvent, alcohol, etc. are removed from the reaction mass, to form a solid block copolymer. The copolymer is washed and dried, to thereby obtain a target polypropylene-b-poly(ethylene-co-propylene).

The composition of the block copolymer can be controlled by modifying the length of the polymerization zone "a" or "b" and the flow rate of the liquid which has flowed out from the corresponding zone (i.e., polymerization time); or the amount of propylene dissolved in container B, and/or the amount of ethylene or that of a mixture of ethylene and propylene.

Alternatively, the polymerization time for forming a polypropylene segment and that for successively forming poly(ethylene-co-propylene) are modified, to thereby modify the length of each block segment.

In addition, a container C' (not shown) containing a hydrocarbon solvent such as toluene may be disposed between the polymerization zone "b" and container D. In container C', residual propylene and/or ethylene monomer are separated from the reaction mass while the polymerization catalyst maintains its activity. A novel polymerization zone c (not shown) may be disposed downstream of container D. In the polymerization zone c, a polypropylene segment may further be formed at an end of the produced polypropylene-b-poly(ethylene-co-propylene), or a poly(ethylene-co-propylene) may further be formed at an end of the new polypropylene segment through polymerization. Alternatively, a poly(ethylene-co-propylene) segment having a different composition may further be formed at an end of the produced polypropylene-b-poly(ethylene-co-propylene) through polymerization.

Thus, homo-polymerization or co-polymerization may be repeated at least twice. Furthermore, prolongation of the polymerization time of a repeated polymerization to approximately 1–2 hours and modification of the composition of the copolymer may also be carried out.

No particular limitation is imposed on the aforementioned solvents (polymerization solvents), and there may be used hydrocarbons such as toluene, xylene, hexane, and heptane, and low-boiling-point hydrocarbons such as liquefied propylene, liquefied propane, and liquefied isobutane.

In the present invention, gas phase polymerization without use of a solvent may also be employed.

Although no particular limitation is imposed on the polymerization conditions for producing polypropylene-b-poly(ethylene-co-propylene), the polymerization temperature is $-20°$ C.$-200°$ C., preferably 0–70° C.; the polymerization pressure is 1–40 atm, preferably 3–30 atm; and the polymerization time is 0.02 seconds to 30 minutes, preferably 0.3 seconds to 2 minutes.

The polymerization conditions will be described for the individual polymerization zone for producing each segment. In the polymerization zone ("a" in FIG. 1) for forming a polypropylene segment, the residence time for polymerization is 0.01 second to 15 minutes, preferably 0.15 seconds to 2.5 minutes, whereas in the polymerization zone ("b" in FIG. 1) for forming a poly(ethylene-co-propylene) segment, the residence time for polymerization is 0.01 second to 15 minutes, preferably 0.15 seconds to 2.5 minutes.

In order to increase the molecular weight of polypropylene-b-poly(ethylene-co-propylene), there is employed a method for increasing the polymerization degree of a polypropylene segment, and/or a method for increasing the polymerization degree of a poly(ethylene-co-propylene) segment.

The aforementioned electron-donating compound (3) serving as an external donor is used in a mol ratio (M/Ti) of 0.05–200, preferably 0.5–100, on the basis of Ti. When the amount of an external donor increases within the above range, the molecular weight of a produced polymer increases.

When the aforementioned electron-donating compound (3) is used as an external donor, the produced polypropylene-b-poly(ethylene-co-propylene) has a weight average molecular weight of 100,000–600,000, or 150,000–500,000. When the weight average molecular weight of is 100,000 or more, the mechanical strength of the polymer is satisfactory. However, when the molecular weight is in excess of 600,000, the fluidity of the molten polymer decreases, to thereby provide poor processability.

Furthermore, in order to increase the molecular weight, the residence time may be prolonged, and the polymerization temperature may be elevated.

In order to lower the n-heptane extraction ratio of polypropylene-b-poly(ethylene-co-propylene), the mol ratio (M/Ti) of the aforementioned electron-donating compound (3) serving as an external donor is increased within the range of 0.05–200, preferably 0.5–100, on the basis of Ti, in a manner similar to that employed for increasing the molecular weight. The polypropylene-b-poly(ethylene-co-propylene) produced in the above manner has an n-heptane extraction ratio of 0–20 wt. %, particularly 0–10 wt. %. Therefore, such a low extraction ratio prevents adhesion of the polymer onto an inner wall of a polymerizer and plugging of a polymerizer by the polymer, which are observed when the n-heptane extraction ratio is in excess of 20 wt. %.

The n-heptane extraction ratio may alternatively be lowered by reducing the polymerization temperature.

Formation of a genuine polypropylene-b-poly(ethylene-co-propylene) in which a polypropylene segment is linked to a poly(ethylene-co-propylene) segment via a chemical bond was ascertained through extraction treatment of an object polymer in accordance with a room-temperature n-heptane extraction method disclosed by the present inventors in Japanese Patent Application Laid-Open (kokai) No. 8–92338. Specifically, the formation was ascertained through comparison of the following extraction ratios: the extraction ratio of the polypropylene-b-poly(ethylene-co-propylene) obtained in the present invention; that of the polypropylene obtained through polymerization by use of the liquid which has flowed out from containers A and B only in the polymerization zone "a"; and that of poly(ethylene-co-propylene) obtained through polymerization by use of the liquid which has flowed out from containers A and C only in the polymerization zone "b."

The weight average molecular weight (Mw) of the obtained polypropylene-b-poly(ethylene-co-propylene) was measured through GPC.

The ethylene content (wt. %) was measured through an infrared absorption (IR) spectroscopic method and a nuclear magnetic resonance (NMR) spectroscopic method. Specifically, a number of calibration curves were prepared by use of a variety of types of copolymers of known ethylene content and samples containing polypropylene and polyethylene in a variety of blending ratios. The content was measured by obtaining an absorption area or an absorption intensity of customary absorption bands by use of an appropriate calibration curve selected from the above calibration curves.

The ethylene content (EL: wt. %) of a copolymer segment is obtained by use of the following equation:

$$EL \text{ (wt. \%)} = \text{total ethylene content (wt. \%)} \times 100/co \text{ content}$$

(wherein the "co content (wt. %)" is represented by the copolymer polymerization amount×100/(the polypropylene polymerization amount+the copolymer polymerization amount).

The poly(ethylene-co-propylene) segment content (co content) was calculated by subtracting the amount of polypropylene formed in the polymerization tube "a" (polypropylene as a control obtained through homopolymerization under the same conditions) from the entire amount of the obtained block copolymer. Alternatively, the co content may be obtained by comparing the latent heat of fusion of a polypropylene segment portion per weight of a sample with the latent heat of fusion (113 J/g) of isotactic polypropylene. However, since the appropriate calibration curve varies depending on the total ethylene content or the type of polymer, a number of calibration curves are prepared for the specific range of the total ethylene content and the type of polymerization. If necessary, a sample was separated by use of a solvent, and the extraction and the residue may be subjected to separate measurement.

The latent heat of fusion of the aforementioned polypropylene segment portion is measured through the following method.

Apparatus: DSC (Type DSC-7, product of Perkin-Elmer)

After heating to 200° C. at a rate of 10° C./minute, maintaining this temperature for 10 minutes, cooling to −100° C. at a rate of 10° C./minute, maintaining this temperature for 10 minutes for making a heat-hysteresis constant, heating to 200° C. at a rate of 10° C./minute was conducted. Thus, a fusion curve is obtained, and the latent heat of fusion of the aforementioned polypropylene segment portion is obtained from the peak corresponding to 130–175° C. in the fusion curve.

The n-heptane extraction ratio of the obtained polypropylene-b-poly(ethylene-co-propylene) was obtained by subjecting dried powder of the polymer (0.6 g) to Soxhlet's extraction with n-heptane (50 ml) under atmospheric pressure for 24 hours. The extraction ratio represents the weight % of the extract based on the weight of the polymer powder.

EXAMPLES

The present invention will next be described in detail by way of examples, which should not be construed as limiting the invention thereto.

Containers A, B, and C are 3 liter water-jacketed containers made of stainless steel, and container D is a 10 liter water-jacketed container made of stainless steel.

[I] First, there are shown some Examples in which no electron-donating compound was added and a solid catalyst component was preliminarily brought into contact with an organometallic compound.

Example I-1

Preparatory treatment: in container A were placed toluene (1 l), chlorine-containing titanium catalyst held on magnesium (hereinafter referred to as "Ti-on-Mg catalyst") (35 g) (THC-C catalyst: product of Toho Titanium Co., Ltd.; the same applies hereinafter), and a 2 mol/l toluene solution of triethylaluminum (30 ml: 60 mmol) (product of Tosoh Akzo), and the mixture was stirred by use of an agitator at 750 rpm for three minutes at 30° C., to thereby preliminarily bring the components into contact through mixing. The Al/Ti mol ratio was 3.

Polymerization: in container B were placed toluene (200 ml), a 2 mol/l toluene solution of triethylaluminum (240 ml: 480 mmol), and propylene (300 g: 7.1 mol); and in container C were placed toluene (900 ml), ethylene (15 g: 0.5 mol), and propylene (35 g: 0.8 mol). Containers B and C were maintained at 30° C. Isopropyl alcohol (5 l) was placed in container D and maintained at 15° C.

Polymerization zones "a" and "b" were maintained at 25° C. Containers A, B, and C were pressurized with nitrogen such that the residence time of reaction mass in each zone was 0.3 second, and polymerization was carried out under these conditions. At the time when a catalyst in container A (i.e., a solid catalyst; the same applies hereinafter) had outflown in an amount of 20–25 g, polymerization reaction was stopped.

After completion of polymerization reaction, the reaction mass was taken from container D, and to the reaction mass, a 35% hydrochloric acid solution (100 ml) was added, followed by stirring for 24 hours. The produced polymer was filtered, and subjected to washing with isopropyl alcohol (1 l) three times, followed by further washing with ion-exchange water (1 l) three times. The washed polymer was filtered and dried under reduced pressure at 60° C. for eight hours, to thereby obtain 19.5 g of a target block copolymer powder.

The block polymer contained a poly(ethylene-co-propylene) segment in an amount of 64.1 wt. % and an ethylene unit in an amount of 33.5 wt. %. The catalytic activity per second for producing the block copolymer was 1.5 g/g-catalyst (hereinafter "-catalyst" refers to a solid catalyst). The n-heptane extraction ratio of the polymer was 23 wt. %, which indicates that only a fraction of the polymer was extracted and the greater part of the polymer remained. The extracted component was poly(ethylene-co-propylene).

The produced block polymer powder had a weight average molecular weight of 94,000.

The produced block polymer powder contained residual inorganic matter in an amount of 90 ppm by weight.

In contrast, the extracted portion of a blank mixture with n-heptane was 57 wt. % (the blank mixture contained 40 wt. % of polypropylene (produced through polymerization of propylene in container B, only in polymerization zone "a") and 60 wt. % of poly(ethylene-co-propylene) (produced through polymerization of an ethylene/propylene mixture in container C, only in polymerization zone "b")). It is considered that the greater part of poly(ethylene-co-propylene) was extracted and only polypropylene remained.

Example I-2

The procedure of Example I-1 was repeated, except that a preparatory treatment was carried out at a Al/Ti mol ratio of 1, and a 2 mol/l toluene solution of triethylaluminum (260 ml: 520 mmol) was placed in container B. A block copolymer was produced in an amount of 17.6 g. The block copolymer contained a poly(ethylene-co-propylene) segment in an amount of 68.8 wt. % and an ethylene unit in an amount of 31.9 wt. %. The catalytic activity was 1.4 g/g-catalyst per second, and the n-heptane extraction ratio of the polymer was 26 wt. %.

The produced block polymer powder had a weight average molecular weight of 86,000.

Example I-3

The procedure of Example I-1 was repeated, except that a preparatory treatment was carried out at a Al/Ti mol ratio of 30 and no triethylaluminum was placed in container B. A block copolymer was produced in an amount of 15.6 g. The block copolymer contained a poly(ethylene-co-propylene) segment in an amount of 68.0 wt. % and an ethylene unit in an amount of 32.0 wt. %. The catalytic activity was 1.2 g/g-catalyst per second, and the n-heptane extraction ratio of the polymer was 25 wt. %.

The produced block polymer powder had a weight average molecular weight of 90,000.

Example I-4

The procedure of Example I-1 was repeated, except that containers were pressurized with nitrogen such that the residence time of reaction mass was 0.4 seconds in polymerization zones "a" and "b" and polymerization reaction was carried out under the conditions. A block copolymer was produced in an amount of 27.3 g. The block copolymer contained a poly(ethylene-co-propylene) segment in an amount of 75.4 wt. % and an ethylene unit in an amount of 27.0 wt. %. The catalytic activity was 1.5 g/g-catalyst per second, and the n-heptane extraction ratio of the polymer was 25 wt. %.

Example I-5

The procedure of Example I-1 was repeated, except that each polymerization reaction in polymerization zones "a" and "b" was carried out at 50° C. A block copolymer was produced in an amount of 20.9 g. The block copolymer contained a poly(ethylene-co-propylene) segment in an amount of 74.7 wt. % and an ethylene unit in an amount of 42.4 wt. %. The catalytic activity was 1.5 g/g-catalyst per second, and the n-heptane extraction ratio of the polymer was 28 wt. %.

Example I-6

The procedure of Example I-1 was repeated, except that polymerization reaction was carried out at 20° C. A block copolymer was produced in an amount of 18.6 g. The block copolymer contained a poly(ethylene-co-propylene) segment in an amount of 73.4 wt. % and an ethylene unit in an amount of 49.1 wt. %. The catalytic activity was 1.2 g/g-catalyst per second, and the n-heptane extraction ratio of the polymer was 20 wt. %.

Comparative Example 1

No External Donor was Used, and a Solid Catalyst Component was Not Preliminary Brought Into Contact With an Organometallic Compound

In container A were placed toluene (1 l), Ti-on-Mg catalyst (35 g), and propylene (150 g: 3.6 mol); in container B were placed toluene (500 ml), a 2 mol/l toluene solution of triethylaluminum (270 ml) (product of Tosoh Akzo), and propylene (150 g: 3.6 mol); and in container C were placed toluene (900 ml), ethylene (15 g: 0.5 mol), and propylene (35 g: 0.8 mol). Containers B and C were maintained at 30° C. Isopropyl alcohol (5 l) was placed in container D and maintained at 15° C.

Thus, the procedure of Example I-1 was repeated. A block copolymer was produced in an amount of 2.2 g. The block copolymer contained a poly(ethylene-co-propylene) segment in an amount of 62.5 wt. % and an ethylene unit in an amount of 23.9 wt. %. The polymer had a weight average molecular weight of 92,000, and the catalytic activity was 0.15 g/g-catalyst per second. The n-heptane extraction ratio of the polymer was 25 wt. %.

Comparative Example 2

Toluene (1 l), and Ti-on-Mg catalyst (35 g) were placed in container A; toluene (200 ml), a 2 mol/l toluene solution of triethylaluminum (270 ml) (product of Tosoh Akzo), and propylene (300 g: 7.1 mol) were placed in container B; and toluene (900 ml), ethylene (15 g: 0.5 mol), and propylene (35 g: 0.8 mol) were placed in container C. Containers B and C were maintained at 30° C. Isopropyl alcohol (5 l) was placed in container D and maintained at 15° C.

Polymerization zones "a" and "b" were maintained at 25° C. Containers A, B, and C were pressurized with nitrogen such that the residence time of reaction mass was 0.3 seconds in each zone, and polymerization was carried out under these conditions. At the time when a catalyst in container A had flowed out in an amount of 20–25 g, polymerization reaction was stopped.

A block copolymer was produced in an amount of 2.0 g. The block copolymer contained the poly(ethylene-co-propylene) segment in an amount of 63.7 wt. %, and an ethylene unit in an amount of 24.6 wt. %. The polymer had a weight average molecular weight of 89,000, and the catalytic activity was 0.15 g/g-catalyst per second. The n-heptane extraction ratio of the polymer was 25 wt. %.

The produced block polymer powder contained residual inorganic matter in an amount of 392 ppm by weight.

The results obtained in the above Examples and Comparative Examples are shown in Table 1.

TABLE 1

| | Polymerization reaction conditions and products | Examples | | | | | | Comp. Examples | |
|---|---|---|---|---|---|---|---|---|---|
| | | I-1 | I-2 | I-3 | I-4 | I-5 | I-6 | 1 | 2 |
| A | Ti/Mg catalyst (g) | 35 | 35 | 35 | 35 | 35 | 35 | 35 | 35 |
| | TEA (mmol) in Tol solvent | 60 | 20 | 600 | 60 | 60 | 60 | — | — |
| | Al/Ti (mol ratio) | 3 | 1 | 30 | 3 | 3 | 3 | — | — |
| | Contact temp. (° C.) | 30 | 30 | 30 | 30 | 30 | 30 | — | — |
| | Contact time (min) | 3 | 3 | 3 | 3 | 3 | 3 | — | — |
| | PL (mol) | — | — | — | — | — | — | 3.6 | — |
| B | TEA (mmol) in Tol solvent | 480 | 520 | 0 | 480 | 480 | 480 | 540 | 540 |
| | PL (mol) | 7.1 | 7.1 | 7.1 | 7.1 | 7.1 | 7.1 | 3.6 | 7.1 |
| C | EL (mol) | 0.5 | 0.5 | 0.5 | 0.5 | 0.5 | 0.5 | 0.5 | 0.5 |
| | PL (mol) in Tol solvent | 0.8 | 0.8 | 0.8 | 0.8 | 0.8 | 0.8 | 0.8 | 0.8 |

TABLE 1-continued

| Polymerization reaction | | Examples | | | | | | Comp. Examples | |
|---|---|---|---|---|---|---|---|---|---|
| conditions and products | | I-1 | I-2 | I-3 | I-4 | I-5 | I-6 | 1 | 2 |
| D | IPA (liter) | 5 | 5 | 5 | 5 | 5 | 5 | 5 | 5 |
| a | Polymerization temp. (° C.) | 25 | 25 | 25 | 25 | 50 | 20 | 25 | 25 |
|   | Residence time (s) | 0.3 | 0.3 | 0.3 | 0.4 | 0.3 | 0.3 | 0.3 | 0.3 |
| b | Polymerization temp. (° C.) | 25 | 25 | 25 | 25 | 50 | 20 | 25 | 25 |
|   | Residence time (s) | 0.3 | 0.3 | 0.3 | 0.4 | 0.3 | 0.3 | 0.3 | 0.3 |
| Polymer | Yield (g) | 19.5 | 17.6 | 15.6 | 27.3 | 20.9 | 18.6 | 2.2 | 2.0 |
|   | EL content (wt %) | 33.5 | 31.9 | 32.0 | 27.0 | 42.4 | 49.1 | 23.9 | 24.6 |
|   | co content (wt %) | 64.1 | 68.8 | 68.0 | 75.4 | 74.7 | 73.4 | 62.5 | 63.7 |
|   | Mol. wt. (Mw) × 10$^4$ | 9.4 | 8.6 | 9.0 | 9.6 | 10.8 | 13.3 | 9.2 | 8.9 |
|   | Extraction ratio (wt %) | 23 | 26 | 25 | 25 | 28 | 20 | 25 | 25 |
|   | Activity (g/g-cat) | 1.5 | 1.4 | 1.2 | 1.5 | 1.5 | 1.2 | 0.15 | 0.15 |
|   | Inorg. Matter (wt ppm) | 90 | 93 | 96 | 82 | 88 | 94 | 383 | 392 |

Notes: A, B, C, and D: Containers; a, b: reaction zones; Tol: toluene; EL: ethylene; PL: propylene; EL content: ethylene content; co content: copolymer content; Extraction ratio: n-heptane extraction ratio; Activity: catalytic activity per gram of solid catalyst per second.

[II] Next, there are shown Examples in which two or more kinds of organometallic compounds were used (including some Examples in which an electron-donating compound was used).

Example II-1

A Solid Catalyst was Preliminarily Brought Into Contact With an Organometallic Compound in the Presence of an External Donor Preparatory treatment: in container A were placed toluene (1 l), a 2 mol/l toluene solution of triethylaluminum (15 ml) (product of Tosoh Akzo), and a 2 mol/l toluene solution of diethylaluminum chloride (15 ml) (product of Tosoh Akzo), and then, diisopropyldimethoxysilane (3.5 g: 0.02 mol) (product of Chisso Corporation) as an organosilicon compound and Ti-on-Mg catalyst (35 g) were placed therein. The components were preliminary brought into contact through mixing at 30° C. for three minutes. The Al/Ti mol ratio was 3, and the Si/Ti mol ratio was 1.

Polymerization: in container B were placed toluene (200 ml), a 2 mol/l toluene solution of triethylaluminum (120 ml), a 2 mol/l toluene solution of diethylaluminum chloride (120 ml), and propylene (300 g: 7.1 mol); and in container C were placed toluene (900 ml), ethylene (15 g: 0.5 mol), and propylene (35 g: 0.8 mol). Containers B and C were maintained at 30° C. Isopropyl alcohol (10 l) was placed in container D and maintained at 15° C.

Polymerization zones "a" and "b" were maintained at 25° C. Containers A, B, and C were pressurized with nitrogen such that the residence time of reaction mass in each zone was 0.3 seconds, and polymerization was carried out under these conditions. At the time when a catalyst in container A had flowed out in an amount of 20–25 g, polymerization reaction was stopped.

After completion of polymerization reaction, the product was taken from container D, and a 35% hydrochloric acid solution (100 ml) was added to the product, followed by stirring for 24 hours. The produced polymer was filtered, and subjected to washing with isopropyl alcohol (1-l) three times, followed by further washing with ion-exchange water (1 l) three times. The washed polymer was filtered and dried under reduced pressure at 60° C. for eight hours, to thereby obtain a target block copolymer powder.

The results are shown in Table 2.

Example II-2

The procedure of Example II-1 was repeated, except that a 2 mol/l toluene solution of triethylaluminum (240 ml) was placed in container B. The results are shown in Table 2.

Example II-3

The procedure of Example II-1 was repeated, except that a 2 mol/l toluene solution of diethylaluminum chloride (240 ml) was placed in container B. The results are shown in Table 2.

Example II-4

No External Donor was Added, and a Solid Catalyst was Preliminarily Brought Into Contact With an Organometallic Compound The procedure of Example II-1 was repeated, except that no diisopropyldimethoxysilane (an external donor) was added in container A. The results are shown in Table 2.

Example II-5

No External Donor was Added, and a Solid Catalyst was not Preliminarily Brought Into Contact With an Organometallic Compound The procedure of Example II-1 was repeated, except that propylene (3.6 mol) was placed in container A; no diisopropyldimethoxysilane (an external donor) was added; solid catalyst was not preliminarily brought into contact with an organometallic compound; an organometallic compound in container A was introduced into container B; and propylene (3.6 mol) was placed in container B. The results are shown in Table 2.

Example II-6

No External Donor was Added, and a Solid Catalyst was not Preliminarily Brought Into Contact With an Organometallic Compound The procedure of Example II-1 was repeated, except that no diisopropyldimethoxysilane (an external donor) was added in container A; a solid catalyst was not preliminarily brought into contact with an organometallic compound; and an organometallic compound in container A was introduced into container B. The results are shown in Table 2.

TABLE 2

| Polymerization reaction conditions and products | | II-1 | II-2 | II-3 | II-4 | II-5 | II-6 |
|---|---|---|---|---|---|---|---|
| A | Ti/Mg catalyst (g) | 35 | 35 | 35 | 35 | 35 | 35 |
| | TEA (mmol) | 30 | 30 | 30 | 30 | — | — |
| | DEAC (mmol) | 30 | 30 | 30 | 30 | — | — |
| | Al/Ti (mol ratio) | 3 | 3 | 3 | 3 | — | — |
| | External donor (mmol) | 20*1 | 20*1 | 20*1 | — | — | — |
| | Si/Ti (mol ratio) | 1 | 1 | 1 | — | — | — |
| | Contact temp. (° C.) | 30 | 30 | 30 | 30 | — | — |
| | Contact time (min) | 3 | 3 | 3 | 3 | — | — |
| | PL (mol) | — | — | — | — | 3.6 | — |
| B | TEA (mmol) | 240 | 480 | — | 240 | 270 | 270 |
| | DEAC (mmol) | 240 | — | 480 | 240 | 270 | 270 |
| | External donor (mmol) | — | — | — | — | — | — |
| | Si/Ti (mol ratio) | — | — | — | — | — | — |
| | PL (mol) | 7.1 | 7.1 | 7.1 | 7.1 | 3.6 | 7.1 |
| C | EL (mol) | 0.5 | 0.5 | 0.5 | 0.5 | 0.5 | 0.5 |
| | PL (mol) | 0.8 | 0.8 | 0.8 | 0.8 | 0.8 | 0.8 |
| | External donor (mmol) | — | — | — | — | — | — |
| | Si/Ti (mol ratio) | — | — | — | — | — | — |
| D | IPA (liter) | 10 | 10 | 10 | 10 | 10 | 10 |
| a | Polymerization temp. (° C.) | 25 | 25 | 25 | 25 | 25 | 25 |
| | Residence time (s) | 0.3 | 0.3 | 0.3 | 0.3 | 0.3 | 0.3 |
| b | Polymerization temp. (° C.) | 25 | 25 | 25 | 25 | 25 | 25 |
| | Residence time (s) | 0.3 | 0.3 | 0.3 | 0.3 | 0.3 | 0.3 |
| Polymer | Yield (g) | 56.5 | 54.9 | 53.4 | 31.2 | 4.0 | 3.8 |
| | EL content (wt %) | 31.4 | 30.6 | 31.0 | 32.5 | 25.9 | 24.9 |
| | Co content (wt %) | 68.5 | 69.3 | 67.8 | 63.1 | 65.1 | 63.8 |
| | Activity (g/g-cat's) | 4.7 | 4.6 | 4.4 | 2.3 | 0.27 | 0.26 |
| | Inorg. matter (wt ppm) | 25 | 26 | 25 | 45 | 290 | 300 |

Notes: A, B, C, and D: Containers; a, b: reaction zones;
Tol: toluene; EL: ethylene; PL: propylene;
EL content: ethylene content;
co content: copolymer content;
Activity: catalytic activity per gram of solid catalyst per second;
TEA: triethylaluminum
DEAC: diethylaluminum chloride
External donor: *1diisopropyldimethoxysilane As is clear from comparison of Examples II-1 through 3 and Example I-1, when an electron-donating compound (an external donor) is used and a solid catalyst is preliminarily brought into contact with an organometallic compound, use of two different kinds of organometallic compounds provides further enhanced catalytic activity and a reduced content of inorganic matter.

As is clear from comparison of Example II-4 and Example I-1, when an electron-donating compound (an external donor) is used and a solid catalyst is not preliminarily brought into contact with an organometallic compound, use of two different kinds of organometallic compounds also provides extensively enhanced catalytic activity and a reduced content of inorganic matter.

As is clear from comparison of Examples II-5 and II-6, and Comparative Examples 1 and 2, when an electron-donating compound (an external donor) is not used, a solid catalyst is not preliminarily brought into contact with an organometallic compound, and two different kinds of organometallic compounds are used, the catalytic activity remains at a low level but is increased, and content of inorganic matter remains at a high level but is improved.

[III] There are shown some Examples in which an organosilicon compound was used as an electron-donating compound (however, one kind of organometallic compound was used).

Example III-1

A Solid Catalyst was Preliminarily Brought Into Contact With an Organometallic Compound in the Presence of an External Donor Preparatory treatment: in container A were placed toluene (1 l), a 2 mol/l toluene solution of triethylaluminum (30 ml) (product of Tosoh Akzo), diisopropyldimethoxysilane (3.5 g: 0.02 mol) (product of Chisso Corporation) as an organosilicon compound, and Ti-on-Mg catalyst (35 g), and the components were preliminary brought into contact through mixing at 30° C. for three minutes. The Al/Ti mol ratio was 3, and the Si/Ti mol ratio was 1.

Polymerization: in container B were placed toluene (200 ml), a 2 mol/l toluene solution of triethylaluminum (240 ml), and propylene (300 g: 7.1 mol); and in container C were placed toluene (900 ml), ethylene (15 g: 0.5 mol), and propylene (35 g: 0.8 mol). Containers B and C were maintained at 30° C. Isopropyl alcohol (5 l) was placed in container D and maintained at 15° C.

Polymerization zones "a" and "b" were maintained at 25° C. Containers A, B, and C were pressurized with nitrogen such that the residence time of reaction mass in each zone was 0.3 second, and polymerization reaction was carried out under these conditions. At the time when a catalyst in container A had flowed out in an amount of 20–25 g, polymerization reaction was stopped.

After completion of polymerization reaction, the product was removed from container D, and a 35% hydrochloric acid solution (100 ml) was added to the product, followed by stirring for 24 hours. The produced polymer was filtered, and subjected to washing with isopropyl alcohol (1-l) three times, followed by further washing with ion-exchange water (1 l) three times. The washed polymer was filtered and dried under reduced pressure at 60° C. for eight hours, to thereby obtain 31.4 g of a target block copolymer powder.

The produced block copolymer had a weight average molecular weight of 349,000 and a molecular weight distribution of 6.2. The copolymer segment content was 72.9 wt. %, and the ethylene unit content was 29.4 wt. %. The n-heptane extraction ratio of the polymer was 9 wt. %, and adhesion of the polymer on a surface of the reactor wall and choking of the reactor were not observed. Catalytic activity per second for producing the block copolymer was 2.6 g/g-catalyst.

Example III-2

The procedure of Example III-1 was repeated, except that 35 g (0.2 mol) of diisopropyldimethoxysilane was added and the Si/Ti mol ratio was 10, to thereby obtain 13.1 g of block copolymer. The copolymer segment content was 69.0 wt. %, and the ethylene unit content was 17.6 wt. %. The polymer had a weight average molecular weight of 401,000 and a molecular weight distribution of 6.2. The n-heptane extraction ratio of the polymer was 8 wt. %, and adhesion of the polymer on a surface of the reactor wall and choking of the reactor were not observed.

Example III-3

The procedure of Example III-1 was repeated, except that 70 g (0.4 mol) of diisopropyldimethoxysilane was added and the Si/Ti mol ratio was 20, to thereby obtain 11.3 g of block copolymer. The copolymer segment content was 44.9 wt. %, and the ethylene unit content was 41.3 wt. %. The polymer had a weight average molecular weight of 442,000 and a molecular weight distribution of 5.1. The n-heptane extraction ratio of the polymer was 9 wt. %, and adhesion of the polymer on a surface of the reactor wall and choking of the reactor were not observed.

Example III-4

The procedure of Example III-1 was repeated, except that the residence time of reaction mass in each reaction zone, "a" and "b," was 0.4 seconds.

Thus, 41.9 g of block copolymer was yielded. The copolymer segment content was 69.7 wt. %, and the ethylene unit content was 27.3 wt. %. The polymer had a weight average molecular weight of 446,000 and a molecular weight distribution of 6.1. The n-heptane extraction ratio of the polymer was 8 wt. %.

Example III-5

The procedure of Example III-1 was repeated, except that diisobutyldimethoxysilane (0.02 mol) was added instead of diisopropyldimethoxysilane.

Thus, 25.1 g of block copolymer was yielded. The copolymer segment content was 76.2 wt. %, and the ethylene unit content was 32.5 wt. %. The catalytic activity was 2.0 g/g-catalyst per second.

Example III-6

The procedure of Example III-1 was repeated, except that cyclohexylmethyldimethoxysilane (0.02 mol) was added instead of diisopropyldimethoxysilane.

Thus, 22.4 g of block copolymer was yielded. The copolymer segment content was 77.2 wt. %, and the ethylene unit content was 30.4 wt. %. The catalytic activity was 1.8 g/g-catalyst per second.

Example III-7

The procedure of Example III-1 was repeated, except that phenyltrimethoxysilane (0.02 mol) was added instead of diisopropyldimethoxysilane.

Thus, 20.2 g of block copolymer was yielded. The copolymer segment content was 70.0 wt. %, and the ethylene unit content was 27.3 wt. %. The catalytic activity was 1.7 g/g-catalyst per second.

Example III-8

The procedure of Example III-1 was repeated, except that diphenyldimethoxysilane (0.02 mol) was added instead of diisopropyldimethoxysilane.

Thus, 20.1 g of block copolymer was yielded. The copolymer segment content was 68.7 wt. %, and the ethylene unit content was 28.1 wt. %. The catalytic activity was 1.7 g/g-catalyst per second.

Example III-9

A Solid Catalyst Component was not Preliminary Brought Into Contact With an Organometallic Compound, and Polymerization Reaction was Carried Out in the Presence of an External Donor Toluene (1 l), Ti-on-Mg catalyst (35 g), diisopropyldimethoxysilane (3.5 g: 0.02 mol) (product of Chisso Corporation) as an organosilicon compound, and propylene (150 g: 3.6 mol) were placed in container A; toluene (500 ml), a 2 mol/l toluene solution of triethylaluminum (270 ml) (product of Tosoh Akzo), and propylene (150 g: 3.6 mol) were placed in container B; and toluene (900 ml), ethylene (15 g: 0.5 mol), and propylene (35 g: 0.8 mol) were placed in container C. Containers B and C were maintained at 30° C. Isopropyl alcohol (5 l) was placed in container D, and maintained at 15° C.

Thus, polymerization reaction was carried out in the same temperature and the same residence time as those in Example III-1, to thereby obtain 3.3 g of block copolymer. The copolymer segment content was 73.4 wt. %, and the ethylene unit content was 32.3 wt. %. The catalytic activity was 0.25 g/g-catalyst per second.

Example III-10

A Solid Catalyst was Preliminarily Brought Into Contact With an Organometallic Compound, and an External Donor was Added When a Copolymer Segment was Formed Through Polymerization <Preparatory Treatment>

Toluene (1 l), a 2 mol/l toluene solution of triethylaluminum (30 ml) (product of Tosoh Akzo), and Ti-on-Mg catalyst (35 g) were placed in container A, and preliminary brought into contact through mixing at 30° C. for three minutes. The Al/Ti mol ratio was 3.

<Polymerization>

Toluene (200 ml), a 2 mol/l toluene solution of triethylaluminum (240 ml), and propylene (300 g: 7.1 mol) were placed in container B; and toluene (900 ml), diisopropyldimethoxysilane (3.5 g: 0.02 mol) (product of Chisso Corporation) as an organosilicon compound, ethylene (15 g: 0.5 mol), and propylene (35 g: 0.8 mol) were placed in container C, and the Si/Ti mol ratio was set to be 1. Containers B and C were maintained at 30° C. Isopropyl alcohol (5 l) was placed in container D, and maintained at 15° C.

Polymerization zones "a" and "b" were maintained at 25° C. Containers A, B, and C were pressurized with nitrogen such that the residence time of reaction mass in each zone was 0.3 seconds, and under the conditions, polymerization reaction was carried out. At the time when a catalyst in container A had been outflown in an amount of 20–25 g, polymerization reaction was stopped.

After completion of polymerization reaction, the product was taken from container D, and to the product, a 35% hydrochloric acid solution (100 ml) was added, followed by stirring for 24 hours. The produced polymer was filtered, and subjected to washing with isopropyl alcohol (1 l) three times, followed by further washing with ion-exchange water (1 l) three times. The washed polymer was filtered and dried under reduced pressure at 60° C. for eight hours, to thereby obtain 23.4 g of a target block copolymer powder.

The copolymer segment content was 69.3 wt. %, and the ethylene unit content was 31.5 wt. %. The catalytic activity was 1.8 g/g-catalyst per second for producing the block copolymer.

Example III-11

A Solid Catalyst was Preliminarily Brought Into Contact With an Organometallic Compound, and an External Donor was Added When Propylene was Polymerized <Preparatory Treatment>

In container A were placed toluene (1 l), a 2 mol/l toluene solution of triethylaluminum (30 ml) (product of Tosoh Akzo), and Ti-on-Mg catalyst (35 g), and the components were preliminary brought into contact through mixing at 30° C. for three minutes. The Al/Ti mol ratio was 3.

<Polymerization>

In container B were placed toluene (200 ml), a 2 mol/l toluene solution of triethylaluminum (240 ml), diisopropyldimethoxysilane (3.5 g: 0.02 mol) (product of Chisso Corporation) as an organosilicon compound, and propylene (300 g: 7.1 mol), and the Si/Ti mol ratio was set to 1. In container C were placed toluene (900 ml), ethylene (15 g: 0.5 mol), and propylene (35 g: 0.8 mol). Containers B and C were maintained at 30° C. Isopropyl alcohol (5 l) was placed in container D and maintained at 15° C.

Polymerization zones "a" and "b" were maintained at 25° C. Containers A, B, and C were pressurized with nitrogen such that the residence time of reaction mass in each zone was 0.3 second, and polymerization reaction was carried out under these conditions. At the time when a catalyst in container A had flowed out in an amount of 20–25 g, polymerization reaction was stopped.

After completion of polymerization reaction, the product was removed from container D, and a 35% hydrochloric acid solution (100 ml) was added to the product, followed by stirring for 24 hours. The produced polymer was filtered and subjected to washing with isopropyl alcohol (1 l) three times, followed by further washing with ion-exchange water (1 l) three times. The washed polymer was filtered and dried under reduced pressure at 60° C. for eight hours, to thereby obtain 24.4 g of a target block copolymer powder.

The copolymer segment content was 73.8 wt. %, and the ethylene unit content was 32.2 wt. %. Catalytic activity per second for producing the block copolymer was 2.0 g/g-catalyst.

The results are shown in Table 3.

TABLE 3

|   | Polymerization reaction conditions and products | Examples | | | |
|---|---|---|---|---|---|
|   |   | III-1 | III-2 | III-3 | III-4 |
| A | Ti/Mg catalyst (g) | 35 | 35 | 35 | 35 |
|   | TEA (mmol) in Tol solvent | 60 | 60 | 60 | 60 |
|   | Al/Ti (mol ratio) | 3 | 3 | 3 | 3 |
|   | External donor (mmol) | 20*1 | 200*1 | 400*1 | 20*1 |
|   | Si/Ti (mol ratio) | 1 | 10 | 20 | 1 |
|   | Contact temp. (° C.) | 30 | 30 | 30 | 30 |
|   | Contact time (min) | 3 | 3 | 3 | 3 |
|   | PL (mol) | — | — | — | — |
| B | TEA (mmol) in Tol solvent | 480 | 480 | 480 | 480 |
|   | PL (mol) | 7.1 | 7.1 | 7.1 | 7.1 |
| C | EL (mol) | 0.5 | 0.5 | 0.5 | 0.5 |
|   | PL (mol) | 0.8 | 0.8 | 0.8 | 0.8 |
| D | IPA (liter) | 5 | 5 | 5 | 5 |
| a | Polymerization temp. (° C.) | 25 | 25 | 25 | 25 |
|   | Residence time (s) | 0.3 | 0.3 | 0.3 | 0.4 |
| b | Polymerization temp. (° C.) | 25 | 25 | 25 | 25 |
|   | Residence time (s) | 0.3 | 0.3 | 0.3 | 0.4 |
| Polymer | Yield (g) | 31.4 | 13.1 | 11.3 | 41.9 |
|   | EL content (wt %) | 29.4 | 17.6 | 41.3 | 27.3 |
|   | co content (wt %) | 72.9 | 69.0 | 44.9 | 69.7 |
|   | Mol. wt. × $10^4$ | 34.9 | 40.1 | 44.2 | 44.6 |
|   | Mol. wt. distribution | 6.2 | 6.2 | 5.1 | 6.1 |
|   | Extraction ratio (wt %) | 9 | 8 | 9 | 8 |
|   | Activity (g/g-cat's) | 2.6 | 1.1 | 0.9 | 2.6 |
|   | Inorg. matter (wt ppm) | 41 | 83 | 92 | 31 |

TABLE 3-continued

|   | Polymerization reaction conditions and products | Examples | | | | | | |
|---|---|---|---|---|---|---|---|---|
|   |   | III-5 | III-6 | III-7 | III-8 | III-9 | III-10 | III-11 |
| A | Ti/Mg catalyst (g) | 35 | 35 | 35 | 35 | 35 | 35 | 35 |
|   | TEA (mmol) | 60 | 60 | 60 | 60 | — | 60 | 60 |
|   | Al/Ti (mol ratio) | 3 | 3 | 3 | 3 | — | 3 | 3 |
|   | External donor (mmol) | 20*2 | 20*3 | 20*4 | 20*5 | 20*1 | — | — |
|   | Si/Ti (mol ratio) | 1 | 1 | 1 | 1 | 1 | — | — |
|   | Contact temp. (° C.) | 30 | 30 | 30 | 30 | — | 30 | 30 |
|   | Contact time (min) | 3 | 3 | 3 | 3 | — | 3 | 3 |
|   | PL (mol) | — | — | — | — | 3.6 | — | — |
| B | TEA (mmol) | 480 | 480 | 480 | 480 | 540 | 480 | 480 |
|   | External donor (mmol) | — | — | — | — | — | — | 20*1 |
|   | Si/Ti (mol ratio) | — | — | — | — | — | — | 1 |
|   | PL (mol) | 7.1 | 7.1 | 7.1 | 7.1 | 3.6 | 7.1 | 7.1 |
| C | EL (mol) | 0.5 | 0.5 | 0.5 | 0.5 | 0.5 | 0.5 | 0.5 |
|   | PL (mol) | 0.8 | 0.8 | 0.8 | 0.8 | 0.8 | 0.8 | 0.8 |
|   | External donor (mmol) | — | — | — | — | — | 20*1 | — |
|   | Si/Ti (mol ratio) | — | — | — | — | — | 1 | — |
| D | IPA (liter) | 5 | 5 | 5 | 5 | 5 | 5 | 5 |
| a | Polymerization temp. (° C.) | 25 | 25 | 25 | 25 | 25 | 25 | 25 |
|   | Residence time (s) | 0.3 | 0.3 | 0.3 | 0.3 | 0.3 | 0.3 | 0.3 |
| b | Polymerization temp. (° C.) | 25 | 25 | 25 | 50 | 25 | 25 | 25 |
|   | Residence time (s) | 0.3 | 0.3 | 0.3 | 0.3 | 0.3 | 0.3 | 0.3 |
| Polymer | Yield (g) | 25.1 | 22.4 | 20.2 | 20.1 | 3.3 | 23.4 | 24.4 |
|   | EL content (wt %) | 32.5 | 30.4 | 27.3 | 28.1 | 32.3 | 31.5 | 32.2 |
|   | co content (wt %) | 76.2 | 77.2 | 70.0 | 68.7 | 73.4 | 69.3 | 73.8 |
|   | Mol wt. (Mw) × $10^4$ | 17.2 | 20.0 | 15.0 | 13.8 | 12.0 | 8.6 | 9.8 |
|   | Mol. wt. distribution | 4.0 | 4.1 | 4.6 | 4.8 | 4.7 | 5.4 | 5.6 |
|   | Extraction ratio (wt %) | 9 | 8 | 8 | 9 | 12 | 15 | 14 |
|   | Activity (g/g-cat's) | 2.0 | 1.8 | 1.7 | 1.7 | 0.25 | 1.8 | 2.0 |
|   | Inorg. matter (wt ppm) | 50 | 51 | 63 | 70 | 360 | 83 | 61 |

Notes: A, B, C, and D: Containers;
a, b: reaction zones;
Tol: toluene; EL: ethylene; PL: propylene;
EL content: ethylene content; co content: copolymer content;
Activity: catalytic activity per gram of solid catalyst per second;
External donor:
*1 diisopropyldimethoxysilane
*2 diisobutyldimethoxysilane
*3 cyclohexylmethyldimethoxysilane
*4 phenyltrimethoxysilane
*5 diphenyldimethoxysilane

[IV] Hereinafter, there are shown some Examples in which a nitrogen-containing heterocyclic compound was used as an electron-donating compound.

Example IV-1

A Solid Catalyst was Preliminarily Brought Into Contact With an Organometallic Compound in the Presence of an External Donor <Preparatory Treatment>

In container A were placed toluene (1 l), a 2 mol/l toluene solution of triethylaluminum (30 ml) (product of Tosoh Akzo), 2,2,6,6-tetramethylpiperidine (2.8 g: 0.02 mol) (product of Tokyo Kasei Kogyo Co., Ltd.) as a heterocyclic compound, and Ti-on-Mg catalyst (35 g), and these components were preliminary brought into contact through mixing at 30° C. for three minutes. The Al/Ti mol ratio was 3, and the N/Ti mol ratio was 1.

<Polymerization>

In container B were placed toluene (200 ml), a 2 mol/l toluene solution of triethylaluminum (240 ml), and propylene (300 g: 7.1 mol). In container C were placed toluene (900 ml), ethylene (15 g: 0.5 mol), and propylene (35 g: 0.8 mol). Containers B and C were maintained at 30° C. Isopropyl alcohol (5 l) was placed in container D and maintained at 15° C.

Polymerization zones "a" and "b" were maintained at 25° C. Containers A, B, and C were pressurized with nitrogen such that the residence time of reaction mass in each zone was 0.3 second, and polymerization reaction was carried out under these conditions. At the time when a catalyst in container A had flowed out in an amount of 20–25 g, polymerization reaction was stopped.

After completion of polymerization reaction, the product was removed from container D, and a 35% hydrochloric acid solution (100 ml) was added to the product, followed by stirring for 24 hours. The produced polymer was filtered, and subjected to washing with isopropyl alcohol (1 l) three times, followed by further washing with ion-exchange water (1 l) three times. The washed polymer was filtered and dried under reduced pressure at 60° C. for eight hours, to thereby obtain 23.6 g of a target block copolymer powder.

The copolymer segment content was 77.5 wt. %, and the ethylene unit content was 37.6 wt. %. The polymer had a weight average molecular weight of 159,000 and a molecular weight distribution of 4.0. The catalytic activity was 1.9 g/g-catalyst per second for producing the block copolymer.

Example IV-2

The procedure of Example IV-1 was repeated, except that 2,2,6,6-tetramethylpiperidine was added in an amount of 0.01 mol (N/Ti =0.5 mol ratio).

Thus, 21.2 g of block copolymer was yielded. The copolymer segment content was 75.7 wt. %, and the ethylene unit content was 35.7 wt. %. The catalytic activity was 1.7 g/g-catalyst per second.

Example IV-3

The procedure of Example IV-1 was repeated, except that 2,2,6,6-tetramethylpiperidine was added in an amount of 28 g (0.2 mol) and the N/Ti mol ratio was set to 10.

Thus, 7.4 g of block copolymer was yielded. The copolymer segment content was 81.9 wt. %, and the ethylene unit content was 42.7 wt. %. The produced block copolymer had a weight average molecular weight of 192,000 and a molecular weight distribution of 4.1.

Example IV-4

The procedure of Example IV-1 was repeated, except that 2,2,6,6-tetramethylpiperidine was added in an amount of 56 g (0.4 mol) and the N/Ti mol ratio was 20.

Thus, 6.2 g of block copolymer was yielded. The copolymer segment content was 79.7 wt. %, and the ethylene unit content was 39.7 wt. %. The produced block copolymer had a weight average molecular weight of 211,000 and a molecular weight distribution of 4.5.

Example IV-5

A Solid Catalyst Component was not Preliminarily Brought Into Contact With an Organometallic Compound, and Polymerization Reaction was Carried Out in the Presence of an External Donor

In container A were placed toluene (1 l), Ti-on-Mg catalyst (35 g), 2,2,6,6-tetramethylpiperidine (2.8 g: 0.02 mol) (product of Tokyo Kasei Kogyo Co., Ltd.) as a heterocyclic compound, and propylene (150 g: 3.6 mol); in container B were placed toluene (500 ml), a 2 mol/l toluene solution of triethylaluminum (270 ml) (product of Tosoh Akzo), and propylene (150 g: 3.6 mol); and in container C were placed toluene (900 ml), ethylene (15 g: 0.5 mol), and propylene (35 g: 0.8 mol). Containers B and C were maintained at 30° C. Isopropyl alcohol (5 l) was placed in container D and maintained at 15° C.

Thus, polymerization reaction was carried out at the same temperature and the same residence time as in Example IV-1, to thereby obtain 3.5 g of block copolymer. The copolymer segment content was 74.4 wt. %, and the ethylene unit content was 32.3 wt. %. The catalytic activity was 0.18 g/g-catalyst per second.

Example IV-6

A Solid Catalyst was Preliminarily Brought Into Contact With an Organometallic Compound, and an External Donor was Added When a Copolymer was Formed Through Polymerization

<Preparatory Treatment>

In container A were placed toluene (1 l), a 2 mol/l toluene solution of triethylaluminum (30 ml) (product of Tosoh Akzo), and Ti-on-Mg catalyst (35 g), and these components were preliminarily brought into contact through mixing at 30° C. for three minutes. The Al/Ti mol ratio was 3.

<Polymerization>

In container B were placed toluene (200 ml), a 2 mol/l toluene solution of triethylaluminum (240 ml), and propylene (300 g: 7.1 mol); in container C were placed toluene (900 ml), 2,2,6,6-tetramethylpiperidine (2.8 g: 0.02 mol) (product of Tokyo Kasei Kogyo Co., Ltd.) as a heterocyclic compound, ethylene (15 g: 0.5 mol), and propylene (35 g: 0.8 mol); and the N/Ti mol ratio was set to 1. Containers B and C were maintained at 30° C. Isopropyl alcohol (5 l) was placed in container D and maintained at 15° C.

Polymerization zones "a" and "b" were maintained at 25° C. Containers A, B, and C were pressurized with nitrogen such that the residence time of reaction mass in each zone was 0.3 second, and polymerization reaction was carried out under these conditions. At the time when a catalyst in container A had flowed out in an amount of 20–25 g, polymerization reaction was stopped.

After completion of polymerization reaction, the product was removed from container D, and a 35% hydrochloric acid solution (100 ml) was added to the product, followed by stirring for 24 hours. The produced polymer was filtered, and subjected to washing with isopropyl alcohol (1-l) three times, followed by further washing with ion-exchange water (1 l) three times. The washed polymer was filtered and dried under reduced pressure at 60° C. for eight hours, to thereby obtain 20.6 g of a target block copolymer powder.

The copolymer segment content was 75.3 wt. %, and the ethylene unit content was 35.3 wt. %. The catalytic activity was 1.6 g/g-catalyst per second for producing the block copolymer.

Example IV-7

The procedure of Example IV-1 was repeated, except that the Residence time of reaction mass in each reaction zone, "a" and "b," was set to be 0.4 seconds.

Thus, 31.6 g of block copolymer was yielded. The copolymer segment content was 77.7 wt. %, and the ethylene unit content was 38.3 wt. %. The produced block copolymer had a weight average molecular weight of 208,000 and a molecular weight distribution of 4.3.

The above-described results are collectively shown in Table 4.

TABLE 4

| | Polymerization reaction conditions and product | Examples | | | | | | |
|---|---|---|---|---|---|---|---|---|
| | | IV-1 | IV-2 | IV-3 | IV-4 | IV-5 | IV-6 | IV-7 |
| A | Ti/Mg catalyst (g) | 35 | 35 | 35 | 35 | 35 | 35 | 35 |
| | TEA (mmol) in Tol solvent | 60 | 60 | 60 | 60 | — | 60 | 60 |
| | Al/Ti (mol ratio) | 3 | 3 | 3 | 3 | — | 3 | 3 |

TABLE 4-continued

| Polymerization reaction conditions and product | | | IV-1 | IV-2 | IV-3 | IV-4 | IV-5 | IV-6 | IV-7 |
|---|---|---|---|---|---|---|---|---|---|
| | | External donor (mmol) | 20*¹ | 10*¹ | 200*¹ | 400*¹ | 20*¹ | — | 20*¹ |
| | | N/Ti (mol ratio) | 1 | 0.5 | 10 | 20 | 1 | — | 1 |
| | | Contact temp. (° C.) | 30 | 30 | 30 | 30 | — | 30 | 30 |
| | | Contact time (min) | 3 | 3 | 3 | 3 | — | 3 | 3 |
| | | PL (mol) | — | — | — | — | 3.6 | — | — |
| B | | TEA (mmol) in Tol solvent | 480 | 480 | 480 | 480 | 540 | 480 | 480 |
| | | PL (mol) | 7.1 | 7.1 | 7.1 | 7.1 | 3.6 | 7.1 | 7.1 |
| C | | EL (mol) | 0.5 | 0.5 | 0.5 | 0.5 | 0.5 | 0.5 | 0.5 |
| | | PL (mol) | 0.8 | 0.8 | 0.8 | 0.8 | 0.8 | 0.8 | 0.8 |
| | | External donor (mmol) | — | — | — | — | 20*¹ | — | — |
| | | N/Ti (mol ratio) | — | — | — | — | — | 1 | — |
| D | | IPA (liter) | 5 | 5 | 5 | 5 | 5 | 5 | 5 |
| | a | Polymerization temp. (° C.) | 25 | 25 | 25 | 25 | 25 | 25 | 25 |
| | | Residence time (s) | 0.3 | 0.3 | 0.3 | 0.3 | 0.3 | 0.3 | 0.4 |
| | b | Polymerization temp. (° C.) | 25 | 25 | 25 | 25 | 25 | 25 | 25 |
| | | Residence time (s) | 0.3 | 0.3 | 0.3 | 0.3 | 0.3 | 0.3 | 0.4 |
| Polymer | | Yield (g) | 23.6 | 21.2 | 7.4 | 6.2 | 3.5 | 20.6 | 31.6 |
| | | EL content (wt %) | 37.6 | 35.7 | 42.7 | 39.7 | 32.3 | 35.3 | 38.3 |
| | | Co content (wt %) | 77.5 | 75.7 | 81.9 | 79.7 | 74.4 | 75.3 | 77.7 |
| | | Mol. wt. (Mw) × 10⁴ | 15.9 | 13.0 | 19.2 | 21.1 | 9.3 | 11.4 | 20.8 |
| | | Mol. wt. distribution | 4.0 | 4.2 | 4.1 | 4.5 | 4.2 | 4.4 | 4.3 |
| | | Activity (g/g-cat's) | 1.9 | 1.7 | 0.6 | 0.5 | 0.18 | 1.6 | 2.5 |
| | | Inorg. matter (wt ppm) | 70 | 70 | 180 | 160 | 380 | 90 | 40 |

Notes: A, B, C, and D: Containers;
a, b: reaction zones;
Tol: toluene; EL: ethylene; PL: propylene;
EL content: ethylene content; co content: copolymer content;
External donor: *¹2,2,6,6-tetramethylpiperidine In accordance with the present invention, polypropylene-b-poly(ethylene-co-propylene), particularly polypropylene-b-poly(ethylene-co-propylene) having a weight average molecular weight of 100,000 or more, can be produced with high efficiency and a low inorganic residue content, the polymer exhibiting excellent blushing resistance and impact resistance and being useful as a compatibilizer for crystalline polyolefins and amorphous polyolefins, a modifier for polyolefins such as polypropylene or polyethylene, and a raw material for molding. Thus, the quality of the products produced from the polymer is easily maintained. When the polymer is molded, there are provided excellent molded products such as film having few fisheyes. In addition, there is produced polypropylene-b-poly(ethylene-co-propylene) having an n-heptane extraction ratio of 20 wt. % or less, resulting in efficient production of the polymer without adhesion of the polymer onto an inner wall of a polymerizer or plugging of a polymerizer.

The present invention enables efficient production of a block copolymer which exhibits improved processability and enhanced properties such as mechanical strength and heat resistance.

What is claimed is:

1. A process for preparing polypropylene-b-poly(ethylene-co-propylene) in the presence of an olefin-polymerizing catalyst comprising a solid catalyst component (1) containing titanium and halogen, or titanium, magnesium, and halogen, and an organometallic compound (2), wherein the solid catalyst component (1) is preliminarily brought into contact with the organometallic compound (2), and then, by use of a tubular continuous polymerizer including a polymerization zone "a" and a polymerization zone "b" located downstream of the zone "a", a polypropylene segment is formed through polymerization in the polymerization zone "a", followed by formation of a poly(ethylene-co-propylene) segment at an end of the polypropylene segment through polymerization in the polymerization zone "b", wherein reactions in the tubular continuous polymerizers are carried out in a plug-flow manner.

2. A process for producing polypropylene-b-poly(ethylene-co-propylene) in the presence of an olefin-polymerizing catalyst comprising a solid catalyst component (1) containing titanium and halogen, or titanium, magnesium, and halogen; an organometallic compound (2); and at least one electron-donating compound (3) selected from the group consisting of organosilicon compounds represented by $R_nSi(OR')_{4-n}$, wherein each of R and R', which may be identical to or different from each other, represents a C1–C10 hydrocarbon group and n is an integer of 1 to 3, and a nitrogenous heterocyclic compound represented by the following formula (1):

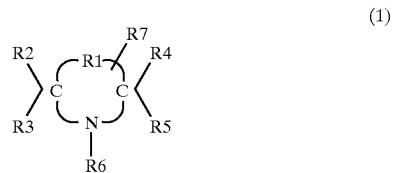

(1)

wherein R1 represents a C1–C6 hydrocarbon group; each of R2, R3, R4, and R5 represents hydrogen or a C1–C6 hydrocarbon group; at least one of R2 and R3 and at least one of R4 and R5 represent hydrocarbon groups, respectively, and R2 and R3 or R4 and R5 may be linked to form a ring; R6 represents hydrogen or a C1–C6 alkyl group or alkyloxy group; and R7 represents hydrogen or a C1–C6 alkyl group or alkyloxy group, wherein by use of a tubular continuous polymerizer including a polymerization zone "a" and a polymerization zone "b" located downstream of the zone "a", a polypropylene segment is formed through polymerization in the polymerization zone "a", followed by formation of a poly(ethylene-co-propylene) segment at an end of the polypropylene segment through polymerization in the polymerization zone "b", and wherein reactions in the tubular continuous polymerizers are carried out in a plug-flow manner.

3. A process for producing polypropylene-b-poly (ethylene-co-propylene) as described in claim 2, wherein the solid catalyst component (1) is preliminarily brought into contact with the organometallic compound (2) in the presence of an electron-donating compound (3).

4. A process for producing polypropylene-b-poly (ethylene-co-propylene) in the presence of an olefin-polymerizing catalyst comprising a solid catalyst component (1) containing titanium and halogen, or titanium, magnesium, and halogen, and an organometallic compound (2), wherein a polypropylene segment is formed through polymerization, and then at least one electron-donating compound (3) selected from the group consisting of organosilicon compounds represented by $R_nSi(OR')_{4-n}$, wherein each of R and R', which may be identical to or different from each other, represents a C1–C10 hydrocarbon group and n is an integer of 1 to 3, and a nitrogenous heterocyclic compound represented by the following formula (1):

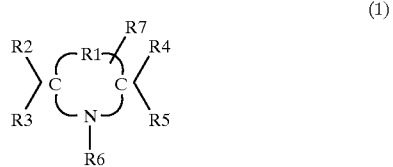

(1)

wherein R1 represents a C1–C6 hydrocarbon group; each of R2, R3, R4, and R5 represents hydrogen or a C1–C6 hydrocarbon group; at least one of R2 and R3 and at least one of R4 and R5 represent hydrocarbon groups, respectively, and R2 and R3 or R4 and R5 may be linked to form a ring; R6 represents hydrogen or a C1–C6 alkyl group or alkyloxy group; and R7 represents hydrogen or a C1–C6 alkyl group or alkyloxy group, is added, followed by formation of a poly(ethylene-co-propylene) segment at an end of the polypropylene segment through polymerization.

5. A process for producing polypropylene-b-poly (ethylene-co-propylene) as described in claim 4, wherein the solid catalyst component (1) is preliminarily brought into contact with the organometallic compound (2).

6. A process for producing polypropylene-b-poly (ethylene-co-propylene) as described in claim 4 or 5, wherein a tubular continuous polymerizer including a polymerization zone "a" and a polymerization zone "b" located downstream of the zone "a" is used and a polypropylene segment is formed through polymerization in the polymerization zone "a", followed by formation of a poly(ethylene-co-propylene) segment at an end of the polypropylene segment through polymerization in the polymerization zone "b."

7. A process for producing polypropylene-b-poly (ethylene-co-propylene) as described in claim 4 or 5, wherein reactions in the tubular continuous polymerizers are carried out in a plug-flow manner.

8. A process for producing polypropylene-b-poly (ethylene-co-propylene) as described in claim 6, wherein reactions in the tubular continuous polymerizers are carried out in a plug-flow manner.

9. A process for producing polypropylene-b-poly (ethylene-co-propylene) as described in any one of claims 1–5, wherein the organometallic compound is constituted by at least two different organometallic compounds represented by $R_nAlCl_{3-n}$, wherein each R represents a C1–C20 alkyl group, an aryl group, or a C3–C20 cycloalkyl group; and n is an integer of 1 to 3 or a half value thereof.

10. A process for producing polypropylene-b-poly (ethylene-co-propylene) as described in claim 6, wherein the organometallic compound is constituted by at least two different organometallic compounds represented by $R_nAlCl_{3-n}$, wherein each R represents a C1–C20 alkyl group, an aryl group, or a C3–C20 cycloalkyl group; and n is an integer of 1 to 3 or a half value thereof.

11. A process for producing polypropylene-b-poly (ethylene-co-propylene) as described in claim 7, wherein the organometallic compound is constituted by at least two different organometallic compounds represented by $R_nAlCl_{3-n}$, wherein each R represents a C1–C20 alkyl group, an aryl group, or a C3–C20 cycloalkyl group; and n is an integer of 1 to 3 or a half value thereof.

12. A process for producing polypropylene-b-poly (ethylene-co-propylene) as described in any one of claims 1–5, wherein each residence time in the polymerization zone "a" and "b" is 0.01 second to 15 minutes.

13. A process for producing polypropylene-b-poly (ethylene-co-propylene) as described in claim 6, wherein each residence time in the polymerization zone "a" and "b" is 0.01 second to 15 minutes.

14. A process for producing polypropylene-b-poly (ethylene-co-propylene) as described in claim 7, wherein each residence time in the polymerization zone "a" and "b" is 0.01 second to 15 minutes.

15. A process for producing polypropylene-b-poly (ethylene-co-propylene) as described in claim 9, wherein each residence time in the polymerization zone "a" and "b" is 0.01 second to 15 minutes.

16. A process for producing polypropylene-b-poly (ethylene-co-propylene) as described in any one of claims 1–5, wherein the produced polypropylene-b-poly(ethylene-co-propylene) has a weight average molecular weight of 100,000 or more.

17. A process for producing polypropylene-b-poly (ethylene-co-propylene) as described in claim 6, wherein the produced polypropylene-b-poly(ethylene-co-propylene) has a weight average molecular weight of 100,000 or more.

18. A process for producing polypropylene-b-poly (ethylene-co-propylene) as described in claim 7, wherein the produced polypropylene-b-poly(ethylene-co-propylene) has a weight average molecular weight of 100,000 or more.

19. A process for producing polypropylene-b-poly (ethylene-co-propylene) as described in claim 9, wherein the produced polypropylene-b-poly(ethylene-co-propylene) has a weight average molecular weight of 100,000 or more.

20. A process for producing polypropylene-b-poly (ethylene-co-propylene) as described in claim 12, wherein the produced polypropylene-b-poly(ethylene-co-propylene) has a weight average molecular weight of 100,000 or more.

21. A process for producing polypropylene-b-poly (ethylene-co-propylene) as described in any one of claims 1–5, wherein the produced polypropylene-b-poly(ethylene-co-propylene) has an n-heptane extraction ratio of 20 wt. % or less.

22. A process for producing polypropylene-b-poly(ethylene-co-propylene) as described in claim 6, wherein the produced polypropylene-b-poly(ethylene-co-propylene) has an n-heptane extraction ratio of 20 wt. % or less.

23. A process for producing polypropylene-b-poly(ethylene-co-propylene) as described in claim 7, wherein the produced polypropylene-b-poly(ethylene-co-propylene) has an n-heptane extraction ratio of 20 wt. % or less.

24. A process for producing polypropylene-b-poly(ethylene-co-propylene) as described in claim 9, wherein the produced polypropylene-b-poly(ethylene-co-propylene) has an n-heptane extraction ratio of 20 wt. % or less.

25. A process for producing polypropylene-b-poly(ethylene-co-propylene) as described in claim 12, wherein the produced polypropylene-b-poly(ethylene-co-propylene) has an n-heptane extraction ratio of 20 wt. % or less.

26. A process for producing polypropylene-b-poly(ethylene-co-propylene) as described in any one of claims 1–5, wherein an amount of inorganic matter derived from the catalyst is 100 ppm or less.

27. A process for producing polypropylene-b-poly(ethylene-co-propylene) as described in claim 6, wherein an amount of inorganic matter derived from the catalyst is 100 ppm or less.

28. A process for producing polypropylene-b-poly(ethylene-co-propylene) as described in claim 7, wherein an amount of inorganic matter derived from the catalyst is 100 ppm or less.

29. A process for producing polypropylene-b-poly(ethylene-co-propylene) as described in claim 9, wherein an amount of inorganic matter derived from the catalyst is 100 ppm or less.

30. A process for producing polypropylene-b-poly(ethylene-co-propylene) as described in claim 12, wherein an amount of inorganic matter derived from the catalyst is 100 ppm or less.

* * * * *